United States Patent
Chang et al.

(10) Patent No.: US 7,917,826 B2
(45) Date of Patent: Mar. 29, 2011

(54) ERROR CORRECTION APPARATUS AND METHOD FOR DATA STORED IN MEMORY

(75) Inventors: Hui-Huang Chang, Hsin-Chu Hsien (TW); Chien-Chih Chen, Hsin-Chu Hsien (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 1237 days.

(21) Appl. No.: 11/462,039

(22) Filed: Aug. 2, 2006

(65) Prior Publication Data

US 2007/0061683 A1    Mar. 15, 2007

(30) Foreign Application Priority Data

Aug. 18, 2005   (TW) ............................... 94128224 A

(51) Int. Cl.
*H03M 13/00* (2006.01)
(52) U.S. Cl. ..................................................... 714/746
(58) Field of Classification Search .................. 714/746, 714/763, 758, 784, 792, 786, 791, 799, 764, 714/768, 770; 712/14
See application file for complete search history.

(56) References Cited

U.S. PATENT DOCUMENTS

| | | | |
|---|---|---|---|
| 5,621,743 A * | 4/1997 | Tomisawa | 714/746 |
| 6,332,206 B1 * | 12/2001 | Nakatsuji et al. | 714/755 |
| 6,662,335 B1 | 12/2003 | Huang | |
| 6,742,156 B2 | 5/2004 | Shieh | |
| 6,742,157 B2 | 5/2004 | Shieh et al. | |
| 7,191,379 B2 * | 3/2007 | Adelmann et al. | 714/758 |
| 7,325,122 B2 * | 1/2008 | Abdelilah et al. | 712/14 |
| 7,509,560 B2 * | 3/2009 | Alexander et al. | 714/763 |
| 2005/0071724 A1 | 3/2005 | Blacquiere | |
| 2005/0193317 A1 | 9/2005 | Chen | |

FOREIGN PATENT DOCUMENTS

TW    I235911    7/2005
* cited by examiner

*Primary Examiner* — Fritz Alphonse
(74) *Attorney, Agent, or Firm* — Winston Hsu; Scott Margo

(57) ABSTRACT

An error correction device includes a main memory, a memory bus coupled to the main memory, and a correction module. The correction module is coupled to the system bus and directly connected to the memory bus. The correction module reads an error data from the main memory via the memory bus according to an error address, generates a correct data according to the error data and an error value, and directly writes the correct data into the main memory via the memory bus. Because the correction module reads and writes the correct data into the main memory without using the system bus managed by an arbitrator, a number of the change row operations can be reduced to increase system efficiency.

17 Claims, 3 Drawing Sheets

ERROR CORRECTION APPARATUS AND METHOD FOR DATA STORED IN MEMORY

BACKGROUND OF THE INVENTION

1. Field of the Invention

The invention relates to a memory accessing technique, and more particularly, to a technique of correcting erroneous data stored in a memory.

2. Description of the Prior Art

Please refer to FIG. 1, which is a functional block diagram of an error correction device 100 cooperating with other function units 130 in a conventional DVD player. As shown in FIG. 1, the error correction device 100 comprises a decoding unit 110 and an error correction unit 120. In this case, the decoding unit 110 is a Reed-Solomon product code (RSPC) decoder for reading data from the main memory 150 through a system bus 140 and executing PI/PO decoding to obtain a plurality of error values and a plurality of error addresses corresponding to said error values. In addition, the error correction unit 120 reads error data from the memory 150 through the system bus 140 according to the error addresses, performs a logical or arithmetical calculation (normally an XOR logic), and then rewrites the calculated correct data into the error address of the memory 150 to overwrite the error data. Therefore, error data stored in the memory 150, which are read from the DVD disc, can be corrected.

As mentioned previously, after the decoding unit 110 obtains the error values and error addresses during the PI/PO decoding operations, the operation of the error correction unit 120 can be illustrated by the following three steps: step (1) reading error data corresponding to a specific error address from the memory 150 through the system bus 140; step (2) performing an error correction logical or arithmetical calculation on the read error data and the error value corresponding to the specific error address; and step (3) writing the result (that is, the correct data) of the calculation back into the error address of the memory 150. Basically, the system is designed to utilize the system bus 140 in the most efficient manner. Therefore, an arbitrator 160 is used to manage the priority of access to the system bus 140 of each function unit, including the error correction device 100. In other words, the system bus 140 is utilized more efficiently by adopting the arbitrator 160. Under the above-mentioned principle, before the error correction unit 120 performs step (1), the error correction unit 120 needs to issue a request to the arbitrator 160 for gaining access to the system bus 140. Furthermore, after finishing the process of reading the error data, the error correction unit 120 will release control of the system bus 140, such that other function units can utilize the system bus 140. Moreover, after the operations of step (2) and before the operations of step (3), the error correction unit 120 will again issue a request to the arbitrator 160, gaining access to the system bus 140, to write the correct data. After the correct data are written into the memory 150, the system bus 140 will again be released such that other function units can utilize the system bus 140.

As known by those skilled in the art, in DRAM when data corresponding to an inactive row needs to be accessed, a change row operation will be performed. Every time when the change row operation is performed, the memory must spend considerable prerequisite preparation time, such as precharge time, active time, and read delay/write delay. After finishing step (1) or step (3), the above-mentioned error correction device 100 releases control of the system bus 140 for other function units' use, and it is likely that these other function units 130 will access the main memory 150 when they have obtained control of the bus. Unfortunately, most of the time, the function units 130 access data in different rows of the main memory 150. This causes frequent change row actions, and thus excessive time spent on data access preparation, for consecutively performed error correction operations. The entire system efficiency is downgraded as a result.

SUMMARY OF THE INVENTION

It is therefore one of the objectives of the claimed invention to provide an error correction device for correcting error data stored in a memory and related method thereof, to reduce the number of change row operations and to increase system efficiency.

According to an exemplary embodiment of the claimed invention, an error correction device is disclosed. The error correction device comprises: a main memory, for storing data; a memory bus, coupled to the main memory; and a correction module, directly connected to the memory bus, for reading an error data from the main memory, generating a correct data according to the error data, and writing the correct data into the main memory to update the error data; wherein the correction module directly accesses the main memory through the memory bus.

According to another exemplary embodiment of the claimed invention, an error correction method is disclosed. The error correction method comprises: connecting a memory bus to a main memory and a correction module; utilizing the correction module to directly access the main memory in order to read an error data from the main memory, generate a correct data according to the error data, and write the correct data into the main memory to update the error data.

According to another exemplary embodiment of the claimed invention, an error correction device for correcting data stored in a memory is disclosed. The error correction device comprises: a decoder, for performing a decoding operation on the data stored in the memory; and an error correction unit, coupled to the decoder through a bus managed by an arbitrator, capable of communicating with the memory without the bus, the error correction unit correcting the data stored in the memory according to a result of the decoding operation.

According to another exemplary embodiment of the claimed invention, an error correction method for correcting data stored in a memory is disclosed. The error correction method comprises: performing a decoding operation to generate at least an error value and at least an error address corresponding to the error value; and continuously correcting the data stored in the memory according to said at least one error value and said at least one error address in the situation of not releasing the utilization priority of a memory bus of the memory during correcting the data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
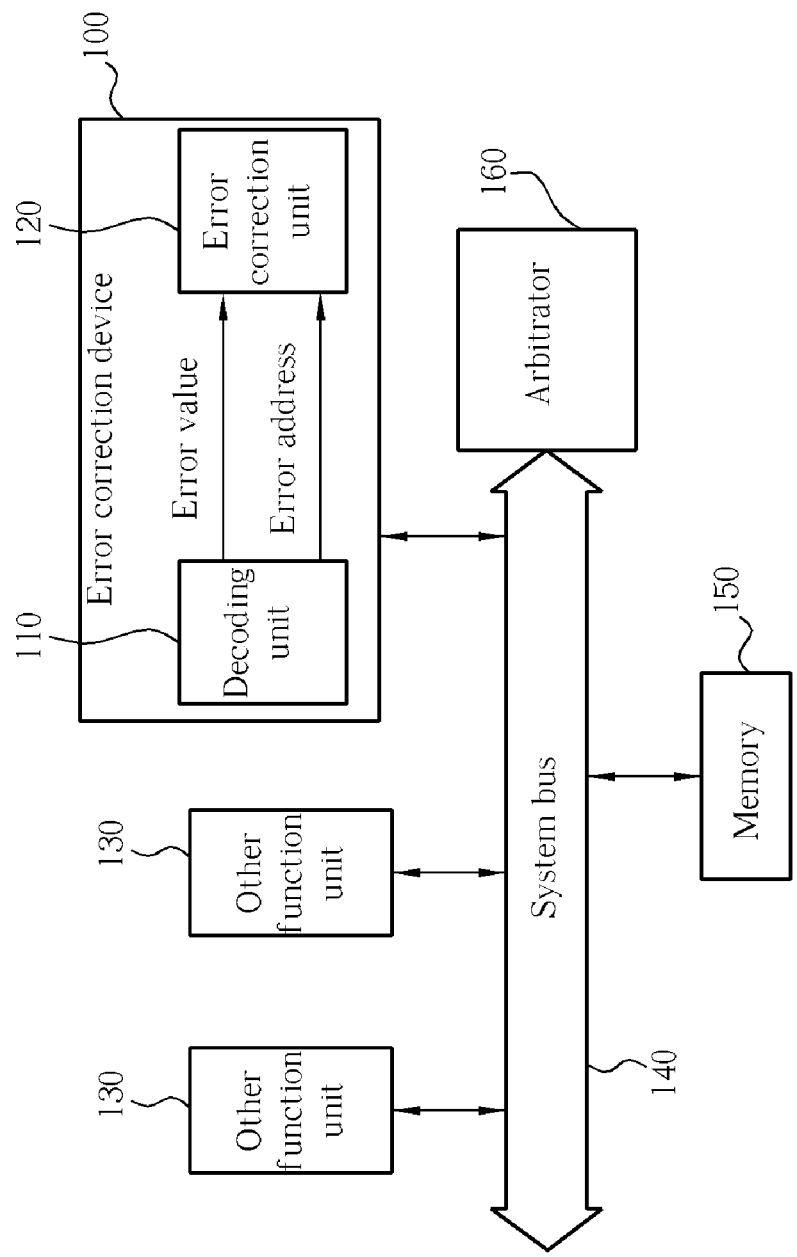
FIG. 1 is a functional block diagram of an error correction device cooperating with other function units in a conventional DVD player.
Figure 2:
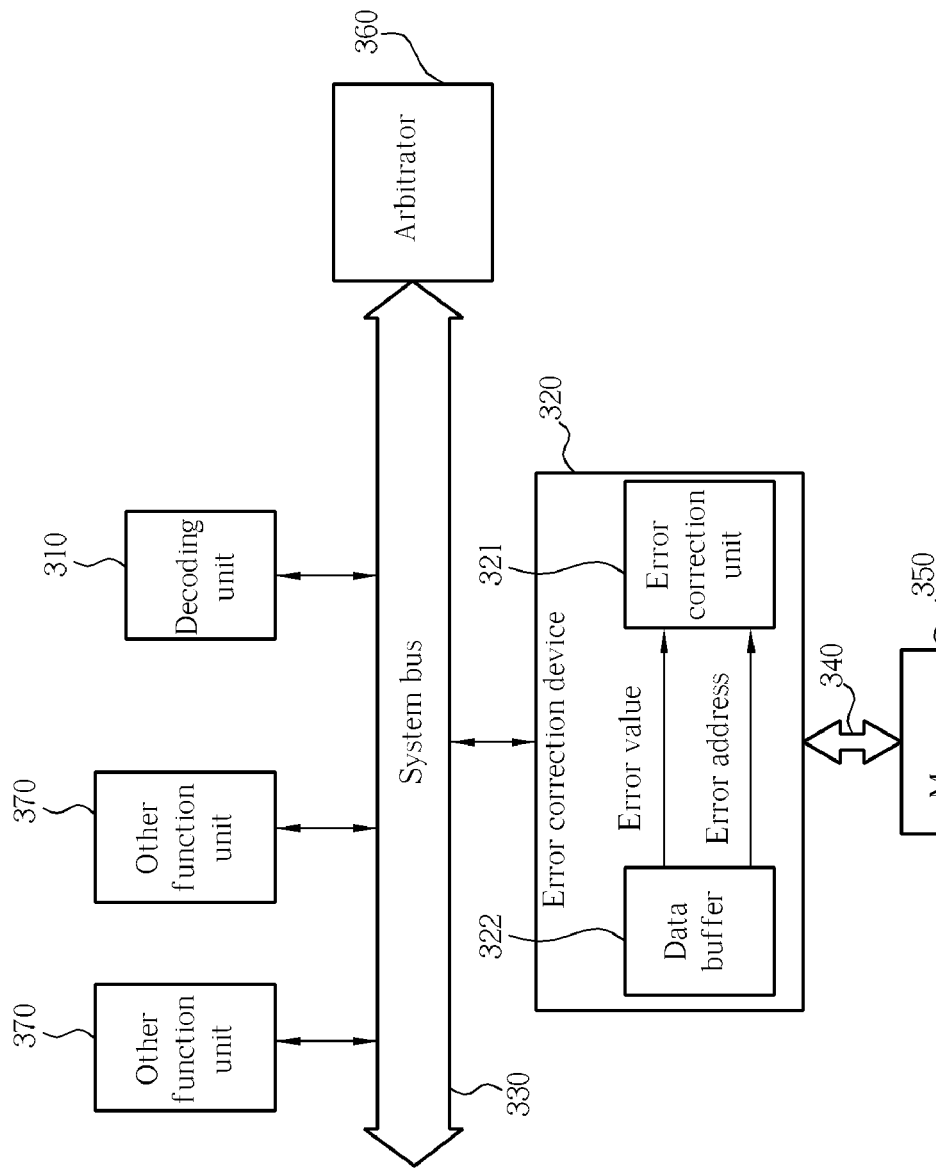
FIG. 2 is a functional block diagram of a DVD error correction device according to an embodiment of the present invention.

Please refer to FIG. 2, which is a functional block diagram of a DVD error correction device according to an embodiment of the present invention. As shown in FIG. 2, the decoding unit 310 and other function units 370 communicate with other parts of the DVD playing device, including the main memory 350, through the system bus 330 managed by an arbitrator 360. In this embodiment, the decoding unit 310 is an RSPC decoding unit for performing PI/PO decoding operations on data of the DVD disc. Furthermore, the error correction device 320, on the one hand, is similarly coupled to the system bus 330, and on the other hand, accesses the main memory 350 through a separate memory bus 340 instead of the system bus 330. In this embodiment, the error correction device 320 comprises, in addition to an error correction unit 322, a data buffer 322 for temporarily storing data. Please note that, the system bus 330, the arbitrator 360, and other function units 370 shown in FIG. 2 perform similar functions and operations as the system bus 140, the arbitrator 160, and other function units 130 as shown and described in FIG. 1. Furthermore, since the decoding unit 310 and other function units 370 access the memory 350 through the system bus 340, the decoding unit 310 and other function units 370 are bound to be controlled by the arbitrator 360 and to share the bandwidth of the system bus 340. However, the correction device 320 can directly access the memory 350 through the memory bus 340.

As is well known by those skilled in the art, when the memory 350 is accessed, a memory management unit (MMU, not shown) is often utilized to access the memory 350 through the memory bus 340. Therefore, the above-mentioned error correction device 320 can be regarded as a part of the MMU. In other words, the error correction device 320 does not need to be managed by the arbitrator 360, but instead can directly accesses the data stored in the memory 350. Please note that, in this embodiment, the error correction 320, which is regarded as a part of the MMU, merely serves as an example and is not viewed as a limitation of the present invention. In actual implementations, the error correction device 320 can also be realized as a separate circuit component.

Figure 3:
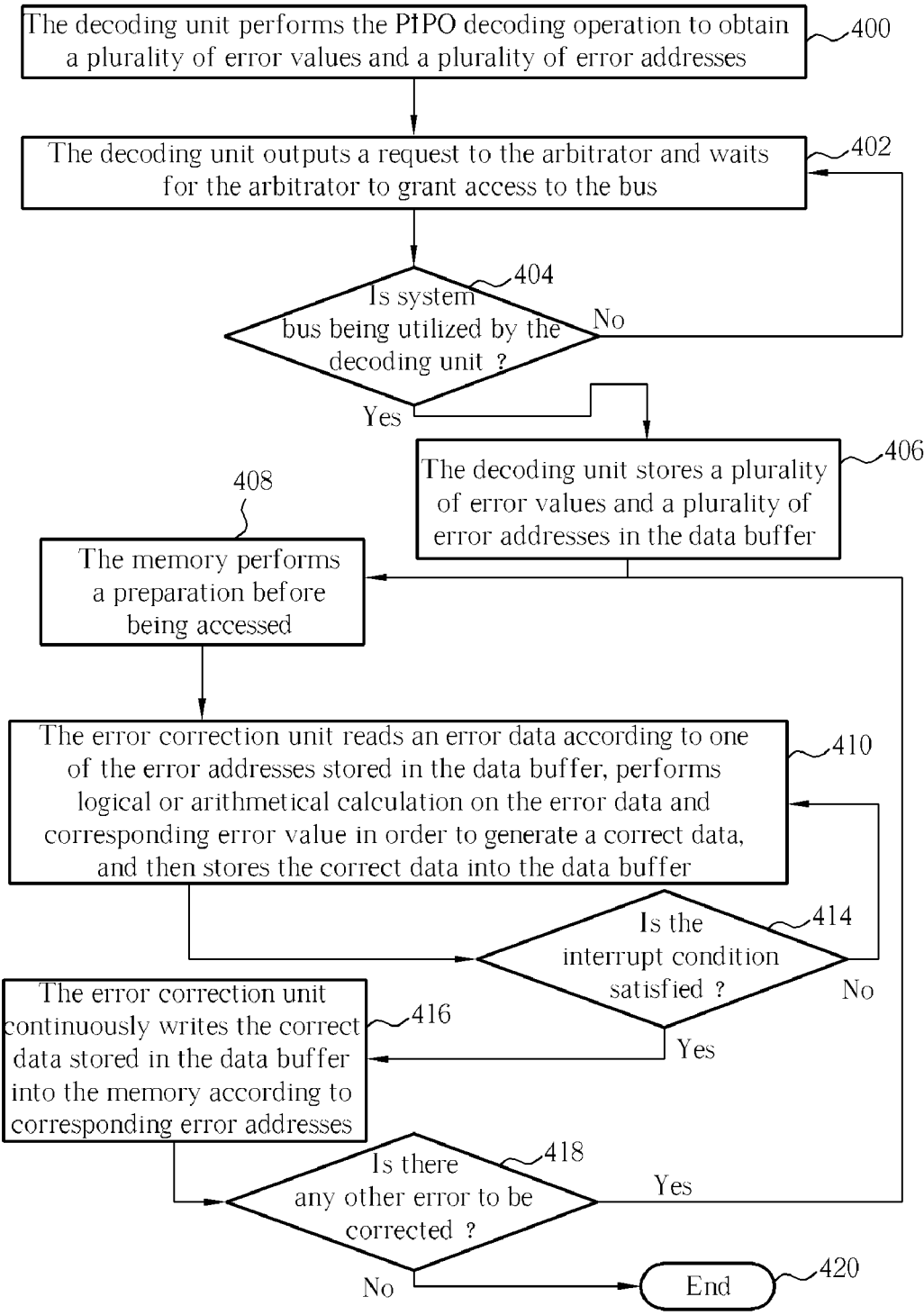
FIG. 3 is an operational flow chart of a DVD error correction device according to an embodiment of the present invention.

Please refer to FIG. 3, which is an operational flow chart of a DVD error correction device according to an embodiment of the present invention. The flow chart comprises the following steps:

Step 400: The decoding unit 310 performs the PI/PO decoding operation to obtain a plurality of error values and a plurality of error addresses;

Step 402: The decoding unit 310 outputs a request to the arbitrator 360 and waits for the arbitrator 360 to arrange a utilization priority;

Step 404: Is the decoding unit 310 granted access to the system bus 330? If yes, then go to step 406; otherwise, go to step 402 and continue waiting;

Step 406: The decoding unit 310 stores a plurality of error values and a plurality of error addresses in the data buffer 322;

Step 408: The memory 350 performs data access preparation;

Step 410: The error correction unit 321 reads an error data according to one of the error addresses stored in the data buffer 322, performs logical or arithmetical calculation on the error data and the corresponding error value to generate a correct data, and then stores the correct data into the data buffer 322;

Step 414: Is an interrupt condition satisfied? If yes, then go to step 416; otherwise, go to step 410;

Step 416: The error correction unit 321 continuously writes the correct data stored in the data buffer 322 into the memory 350 according to the corresponding error addresses;

Step 418: Is there any other error to be corrected? If yes, go to step 408; otherwise, go to step 420;

Step 420: Finish.

First, the decoding unit 310 performs the PI/PO decoding operation on the data stored in the memory 350 to obtain a plurality of error values and a plurality of error addresses (step 400). Next, the decoding unit 310 outputs a request to the arbitrator 360 and waits for access being granted (step 402). Then, through management of the arbitrator 340, access of the system bus 340 is passed to the decoding unit 310 (step 404). Therefore, the decoding unit 310 can store a plurality of error values and a plurality of error addresses into the data buffer 322 through the system bus 330 (step 406).

After the data buffer 322 stores the error values and the error addresses, the error correction unit 321 corrects the error data in the memory 350 according these error addresses. In other words, the error correction unit 321 needs to first read error data corresponding to the error addresses. As mentioned previously, before the data are read, the memory 350 first performs data access preparation (step 408). Then the error correction unit 321 subsequently reads the error data corresponding to the plurality of error addresses, and performs logical or arithmetical calculation on the read error data and corresponding error values, in order to generate correct data. Furthermore, the error correction unit 321 stores the calculated correct data into the data buffer 322 (step 410).

Please note, the error correction unit 321 occupies the bandwidth of the memory bus 340 when accessing the memory 350. In other words, considering that other function units 370 also need to utilize the memory 350, optimization of the operation of the error correction unit 321 is accounted for. Here an interrupt condition is adopted in order to optimize the operation of the error correction unit 321. When the interrupt condition is satisfied, the error correction unit 321 pauses to read data from the memory 350, and releases control, or occupation, of the memory bus 340 for other function units' use (step 414).

In the following disclosure, the embodiments of the aforementioned interrupt condition will be detailed. As an example, when the data buffer 322 no longer stores any error address; that is to say, the error correction unit 321 has processed all the error data corresponding to all error addresses in the data buffer, and the calculated correct data are all stored into the data buffer 322, the error correction unit 321 can release the memory bus 340 for other function units' use. Alternatively, the interrupt condition can be set so that upon finishing correcting a specific number of error data (for example, 16 errors or 32 errors), the right to access to the memory bus is released.

In addition, as mentioned previously, when consecutively accessing data in different rows of the memory 350, preparation actions, such as precharge and active, need to be performed on the next accessed row. Therefore, in order to achieve the best efficiency when continuously accessing the memory 350, the error correction unit 321 can be designed to, when change row operation is in need, pause error correction and release control of the memory bus 340 for other function units' use. Until next time the error correction unit 321 is again granted access to the memory bus 340, the access of the remaining error data can then be resumed.

By doing so, it is ensured that the correct data being written back in each round correspond to the same row of the memory 350. The error correction unit 321 can continuously write all of the correct data into the memory 350 and correct the error data therein without spending additional memory clock cycles to execute the change row operation (step 416). At this time, if all error data are corrected, the entire error correction procedure is completely performed (step 420). Otherwise, the error correction unit 321 returns to step 408 to further read the error data in the memory 350 and perform the next portion of the error correction procedure (step 418).

Please note that, adoption of the interrupt condition merely serves to raise the efficiency of the memory, or in a different sense can be regarded as raising the effective bandwidth of the memory. In other words, the interrupt condition is only an optional step, and is not meant as a limitation of the present invention. Moreover, the present invention is not limited to the above-mentioned two interrupt conditions. That is, the present invention can adopt other interrupt conditions, and such alterations still falls within the scope of the present invention.

Please note that, the PI/PO decoding operation on the DVD disc data serves only as an embodiment of the present invention. The present invention does not limit the fields in which the present invention is used. That is, the present invention can be adopted into any field of application for data error correction in memory.

The above-mentioned embodiments can continuously read multiple error data and continuously store multiple correct data. Therefore, the memory does not need to perform read/write switching operations. Even if two successive errors correspond to different memory rows, because the error correction device maintains access to the memory bus and does not share the memory bus with other function units, the error correction device can read and write data at the same error address in a row without interference of other function units. Therefore, change row operation of the memory can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An error correction device, for connecting to a system bus managed by an arbitrator, comprising:
    a main memory, for storing data;
    a memory bus, coupled to the main memory; and
    a correction module, coupled to the system bus and directly connected to the memory bus, for reading an error data from the main memory, generating a correct data according to the error data, and writing the correct data into the main memory to update the error data;
    wherein the correction module directly accesses the main memory through the memory bus, and the correction module comprises:
        a data buffer, for temporarily storing at least an error value and at least an error address corresponding to the error value; and
        an error correction unit, coupled to the data buffer, for reading the error data according to the error address stored in the data buffer, generating the correct data according to the error data and the error value stored in the data buffer, and writing the correct data into the main memory according to the error address stored in the data buffer.

2. The error correction device of claim 1 further comprising:
    a decoding unit, coupled to the system bus, for reading data from the memory through the system bus, performing a calculation on the data read from the main memory to generate an error value and an error address, and transferring the error value and the error address to the correction module;
    wherein the correction module reads the error data according to the error address, corrects the error data according to the error value in order to generate the correct data, and writes the correct data into the main memory according to the error address.

3. The error correction device of claim 1, wherein the data buffer is further utilized to temporarily store the correct data.

4. The error correction device of claim 1, wherein the main memory is a dynamic random access memory (DRAM).

5. The error correction device of claim 1, wherein the data stored in the main memory originates from a disc.

6. The error correction device of claim 5, wherein the disc is a DVD disc.

7. An error correction method comprising:
    connecting a memory bus to a main memory and a correction module;
    reading data from the main memory;
    performing a calculation on the data to generate an error value and an error address;
    transferring the error value and the error address to the correction module via a system bus;
    utilizing the correction module to directly access the main memory in order to read an error data from the main memory according to the error address, correct the error data according to the error value in order to generate a correct data, and write the correct data into the main memory to update the error data.

8. The error correction method of claim 7, wherein the step of updating the error data comprises:
    temporarily storing the error value and the error address corresponding to the error value; and
    reading the error data according to the error address, generating the correct data according to the error data and the temporarily stored error value, and writing the correct data into the main memory according to the error address.

9. The error correction method of claim 8, wherein the step of correcting the error data further comprises:
    temporarily storing the correct data.

10. The error correction method of claim 8, wherein if no error address or error value is temporarily stored, releasing the utilization priority of the memory bus.

11. The error correction method of claim 8 further comprising:
    temporarily storing a plurality of error values and a plurality of error addresses corresponding to the error values; and
    when updating data of the main memory, if the main memory encounters a row address change, releasing the utilization priority of the memory bus.

12. The error correction method of claim 7, wherein the data stored in the memory are read from a disc.

13. The error correction method of claim 12, wherein the disc is a DVD disc.

14. An error correction method for correcting data stored in a memory, the error correction method comprising:

performing a decoding operation to generate at least an error value and at least an error address corresponding to the error value; and continuously correcting the data stored in the memory by reading the data stored in the memory according to the error address, generating a correct data according to the error address and corresponding data, and storing the correct data back into the memory in a situation of not releasing utilization priority of a memory bus of the memory during correcting the data.

15. The error correction method of claim 14 further comprising:

transferring said at least one error value and said at least error address generated by the decoding operation through a bus managed by an arbitrator.

16. The error correction method of claim 14 further comprising:

reading data from a DVD disc and storing the data into a memory.

17. The error correction method of claim 14, wherein the decoding operation is a Reed-Solomon product code (RSPC) decoding operation.

* * * * *